Dec. 15, 1959  V. H. JUNGJOHANN  2,916,965
SLIDE CHANGER

Filed Nov. 22, 1957  3 Sheets-Sheet 1

Vernon H. Jungjohann
INVENTOR.

BY R. Frank Smith
Steve W. Grembow
ATTORNEYS

Dec. 15, 1959  V. H. JUNGJOHANN  2,916,965
SLIDE CHANGER
Filed Nov. 22, 1957  3 Sheets-Sheet 2
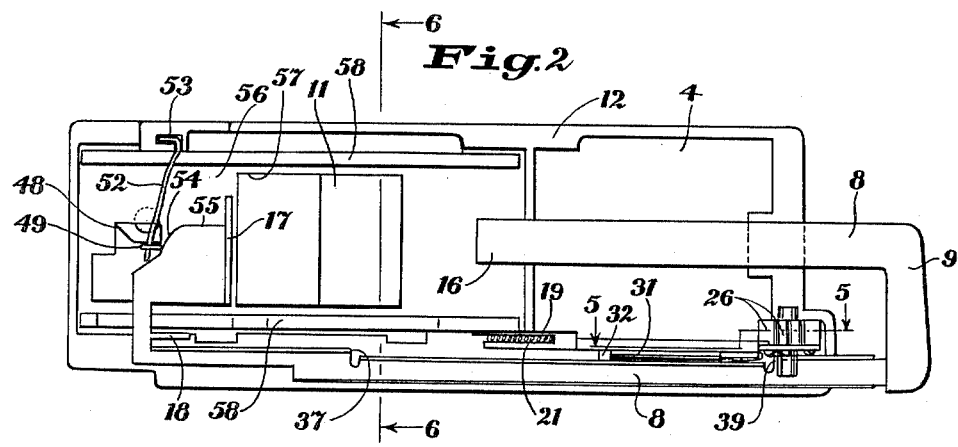
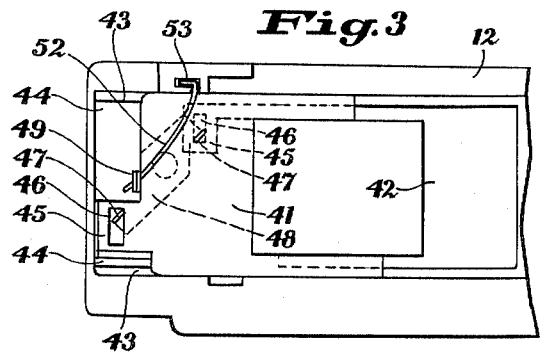
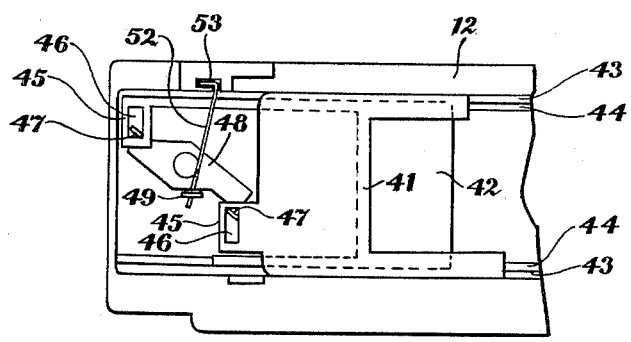
Vernon H. Jungjohann
INVENTOR.
BY
ATTORNEYS Dec. 15, 1959   V. H. JUNGJOHANN   2,916,965
SLIDE CHANGER
Filed Nov. 22, 1957   3 Sheets-Sheet 3
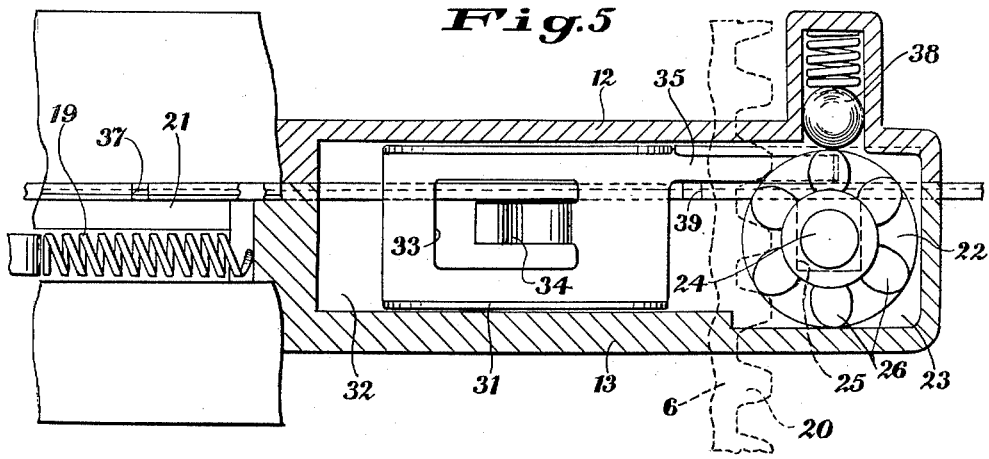
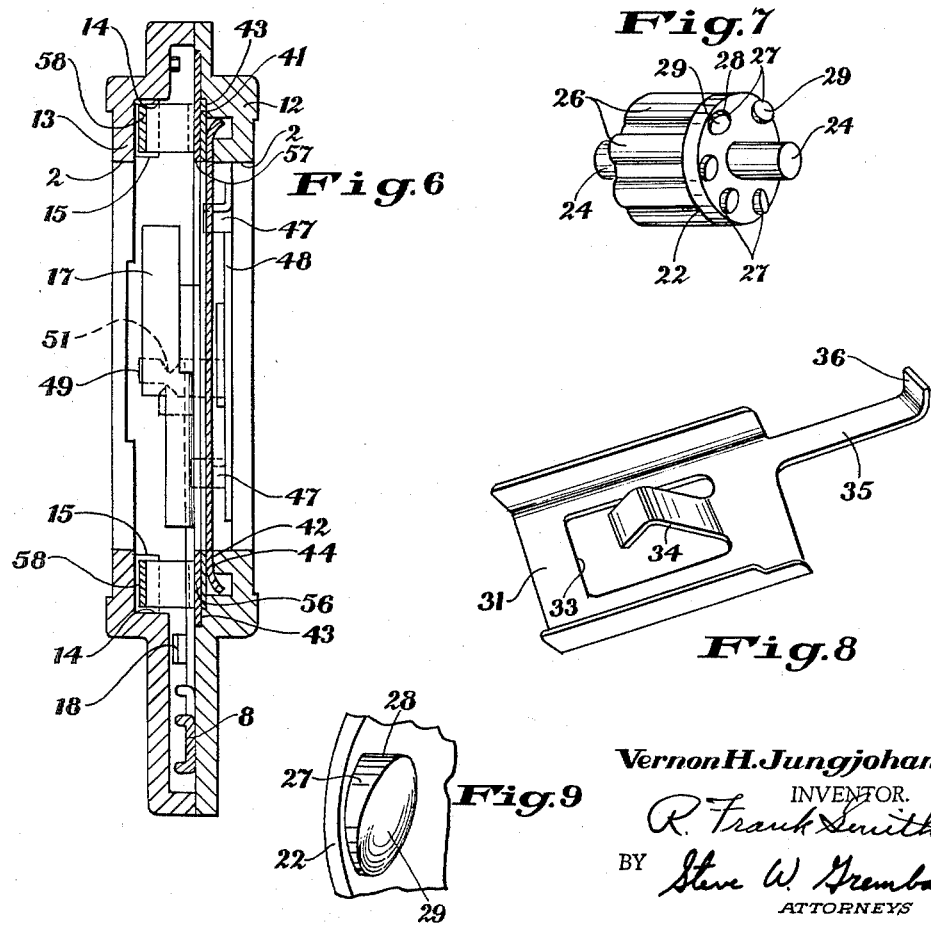
Vernon H. Jungjohann
INVENTOR.
BY
ATTORNEYS _United States Patent Office_  2,916,965
Patented Dec. 15, 1959

2,916,965
SLIDE CHANGER

Vernon H. Jungjohann, Rochester, N.Y., assignor to Eastman Kodak Company, Rochester, N.Y., a corporation of New Jersey Application November 22, 1957, Serial No. 698,159

8 Claims. (Cl. 88—28)

This invention relates generally to apparatus for exhibiting transparent slides, and more specifically to a slide changer for moving a slide out of a magazine into a viewing position, returning the slide into the magazine, and automatically advancing the magazine to place another slide in position to be engaged and moved into the viewing position by the slide changer.

One of the primary objects of the present invention is to provide an improved slide changer for a slide projector that is of simple design and construction, thoroughly reliable and efficient in operation, and economical to manufacture.

Another object of the invention is the provision of an improved slide changer for a slide projector having improved means for moving the slide magazine along the light beam in a step-by-step fashion.

One more object of the invention is to provide a slide changer having an improved shutter mechanism for closing off the aperture in the slide changer when no slide is present therein.

Objects and advantages other than those set forth above will be apparent from the following description when read in connection with the accompanying drawing, in which:

Fig. 2 is a side elevation view of the rear frame member of the slide changer of Fig. 1 with a slide transfer member, spring, pawl and indexing gear superimposed thereon;

Fig. 3 is a fragmentary view of one end of the frame member of Fig. 2 with the shutter cover plate omitted showing the shutter mechanism in a wide open position;

Fig. 4 is a view similar to Fig. 3 showing the shutter mechanism in a closed position;

Fig. 5 is an enlarged section view taken along line 5—5 of Fig. 2 with both the rear and front frame members secured together as in Fig. 1 and having a segmental portion of the magazine superimposed thereon showing the gear rack;

Fig. 6 is an enlarged section view taken along line 6—6 of Fig. 2 with both the rear and front frame members secured together as in Fig. 1;

Fig. 7 is a perspective view of the indexing gear shown in Fig. 5;

Fig. 8 is a perspective view of the pawl shown in Fig. 5; and

Fig. 9 is an enlarged perspective view of one of the projections carried by the gear.

Figure 1:
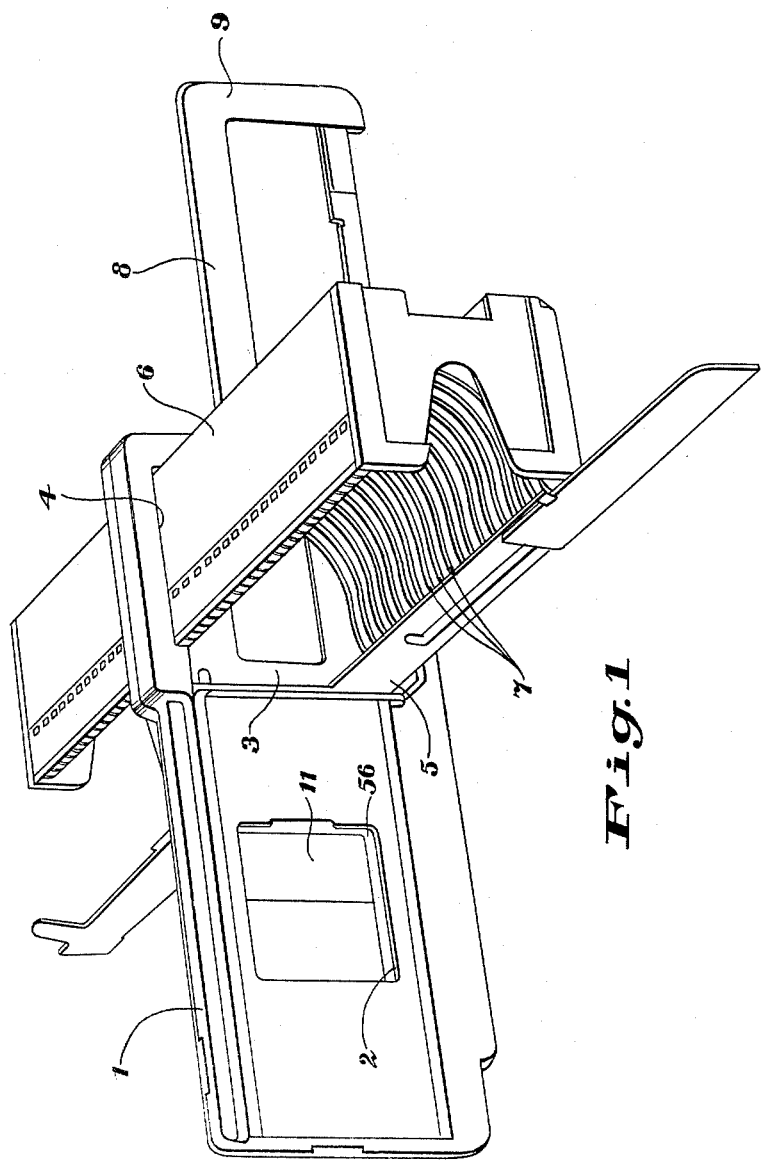
Fig. 1 is a perspective view of a slide changer embodying the invention.

As shown in the drawings, the slide changer has a narrow substantially rectangular housing 1 adapted to fit into a suitable slot in a projector, not shown, so that an aperture 2 in the housing 1 aligns with a lens and source of light contained within the projector. Thus, when a slide 3 to be viewed is in alignment with the optical system, a representation will be thrown onto a screen, not shown. The housing 1 is provided with an opening 4 near one end and a magazine supporting and guiding means 5 is disposed therein transversely of the housing 1 and secured thereto by any suitable means. A magazine 6 is slidably mounted on the supporting and guiding means 5 and contains a plurality of partitions 7 which cooperate with one another to form individual slide holders. A slide-transferring means 8 is shown projecting outwardly from one end of the housing 1 and is adapted when moved by the handle 9 toward the magazine 6 to engage a slide 3 and move it out of the magazine 6 into the housing 1 in register with the aperture 2. As the slide 3 and slide-transferring means 8 move into the housing 1, shutter means 11 carried by the housing 1 are opened and light passes through the slide 3. As the transfer member 8 is moved back to its original position, it pushes the slide 3 out of the housing 1 and returns it to its original location in the magazine 6. As the transfer member 8 moves toward a fully withdrawn position, it actuates a mechanism which advances the magazine 6 a sufficient distance to place a succeeding slide holder and slide 3 in alignment with the housing 1 and transfer member 8.

As shown in greater detail in Figs. 5 and 6, the housing 1 is formed of a pair of complementary frame members 12, 13 secured together by any suitable means. The frame member 13 is provided with shoulders 14 forming a channel for guiding the slide 3, and is further provided with abutments 15 to limit the forward movement of the slide 3 and position the slide in register with the aperture 2. The slide-transferring means 8 is shown in Fig. 2 as a generally C-shaped member having an arm 16 adapted to engage one edge of the slide 3 to move the slide into register with the aperture 2 as the transfer member 8 is moved into the housing 1 by means of the handle 9. The transfer member 8 also forms a flange 17 adapted to engage the opposite edge of the slide 3 to move the slide back into the magazine 6 when the transfer member 8 is returned to its original position. The transfer member 8 has a finger 18 adapted to engage and compress a spring 19 disposed in a small channel 21 formed by the frame member 13 as the transfer member 8 is moved into its fully withdrawn position. When the transfer member 8 is released, the spring 19 urges the transfer member 8 into the housing 1 a slight amount causing the flange 17 to be withdrawn from the edge of the opening 4, and enables the magazine 6 to be moved back and forth by hand free of interference with the magazine 6 and slides 3.

The magazine-advancing mechanism as best shown in Figs. 5, 7 and 8 comprises a plastic molded indexing gear 22 disposed within a recess 23 formed by the frame members 12, 13. The gear 22 has integrally formed spindles 24 disposed within slots 25 shown dotted in Fig. 5 formed by the frame member 13 to position the gear 22 with its gear teeth 26 partially extending into the opening 4 as seen in Fig. 2. The slide magazine 6 is provided with a gear rack 20 shown dotted in Fig. 5 extending along the magazine complementary to the gear 22 and having its gear teeth of a selected pitch so that when the rack is advanced one tooth the magazine 6 is advanced a distance sufficient to align a succeeding slide 3 with the housing 1 and transfer member 8. The gear 22 is further provided along one side with a plurality of cylindrical projections 27 angularly spaced around the gear 22 at a common radius. Each of the projections 27 is provided with an axially extending leading edge 28 and an inclined trailing edge 29 as best seen in Fig. 9. An indexing pawl 31 is disposed in a slot 32 formed by the frame members 12, 13 and essentially comprises a unitary U-shaped channel member as seen in Figs. 2, 5 and 8 having a U-shaped groove 33 to form a spring finger 34 engageable with one of the frame members 13 to slidably retain the indexing pawl 31 in a selected position within the slot 32, and to prevent the pawl 31 from freely sliding back and forth within the slot 32. The pawl 31 further has an extending arm 35 having a lip 36 at its end adapted when the pawl 31 is moved into an indexing position to engage the leading edge 28 of the projections 27 to rotate the gear 22 one tooth and advance the slide magazine 6 one slide position. The transfer member 8 has a shoulder 37 as seen in Figs. 2 and 5 adapted to engage and move the indexing pawl 31 within the slot 32 into the indexing position as the transfer member 8 nears its fully withdrawn position. A spring and steel ball detent means 38 is carried by the frame member 12 as seen in Fig. 2 and cooperates with the gear teeth 26 to releasably hold the gear 22 in its advanced position while the pawl 31 is returned to its original non-indexing position. A shoulder 39 of the transfer member 8 engages and urges the pawl 31 into the non-indexing position when the transfer member 8 is moved into the housing 1 to place a slide 3 in a projecting position. The lip 36 of the pawl 31 rides over the inclined trailing edge 29 of one of the projections 27 as the pawl 31 is returned to the non-indexing position.

A shutter mechanism 11 for closing the aperture 2 when a slide 3 is not present comprises a pair of substantially U-shaped shutter blades 41, 42 as seen in Figs. 3 and 4. One of the shutter blades 41 is disposed for sliding movement along guideways 43 formed by the frame member 12, and the other blade member 42 is disposed for reciprocal sliding movement along guideways 44 with the blades in sliding contact with one another as best seen in Fig. 6. Each of the blades 41, 42 is provided with a flange 45 having an elongated slot 46 for receiving an upturned lug 47 formed by the corresponding end of a shutter lever 48. The shutter lever 48 is pivotally mounted intermediate its ends to the frame member 12. The lever 48 further has an upturned ear 49 provided with a notch 51 as seen in Fig. 6 for receiving one end of a spring 52, the opposite end of the spring 52 being held by a slot 53 formed by the frame member 12. The spring 52 is under tension so that it constantly urges the ear 49 in a counterclockwise direction as seen in Fig. 4 causing the shutter blades 41, 42 to close. The transfer member 8 is provided with a cam 54 as seen in Fig. 2 which is adapted to engage the ear 49 and pivot the shutter lever 48 causing the blades 41, 42 to open shortly before the slide 3 is disposed in register with the aperture 2. The cam 54 has a flat portion 55 cooperating with the ear 49 to releasably lock the shutter blades 41, 42 in a fully opened position when the transfer member 8 has been moved all the way in positioning the slide 3 in register with the aperture 2. Accordingly, the operator need not hold the transfer member 8 in against the bias of the shutter spring 52 while the slide 3 is being projected. A shutter cover plate 56 having an opening 57 in register with the aperture 2 is carried by the frame member 12 as seen in Figs. 2 and 6 to cover or shield the shutter blades 41, 42 and is further provided with springs 58 adapted to urge the slide 3 against the frame member 13 during projection.

In the operation of this invention, let us assume initially that the magazine 6 is loaded with slides 3 and the slide transfer means 8 is in a fully withdrawn position. To project the slides 3, the operator grasps the handle 9 and moves the slide transfer member 8 inwardly causing the arm 16 to engage one edge of one slide 3 and urge the slide along the channel 14 into engagement with the abutments 15. This places the slide 3 in a slide projecting position. As the transfer member 8 is moved inwardly, the shoulder 39 engages and urges the pawl 31 into a non-indexing position. Also, the cam 54 actuates the ear 49 causing the shutter blades 41, 42 to open. After the slide 3 has been projected, the operator withdraws the transfer member 8 causing the flange 17 to engage the other end of the slide 3 and urge the slide back into the magazine 6. Initial outward movement of the transfer member 8 withdraws the cam 54 from the ear 49 permitting the shutter blades 41, 42 to close. As the member 8 nears the end of its outward travel, the shoulder 37 engages and urges the indexing pawl 31 into an indexing position causing the lip 36 to strike the leading edge 28 of the projection 27 advancing the gear 22 one tooth and the magazine 6 one slide. Also, the finger 18 compresses the spring 19, and when the operator releases the handle 9, the spring 19 urges the transfer member 8 inwardly a slight amount to withdraw the flange 17 from the opening 4 and out of engagement with the magazine 6 and slides 3.

Although but one embodiment has been illustrated and described, it will be apparent to those skilled in the art that various changes and modifications may be made therein without departing from the spirit of the invention or from the scope of the appended claims.

I claim:

1. In a slide changer for a slide projector, the combination of: a housing having an aperture through which a slide is projected; a support member disposed transversely of said housing for slidably supporting a magazine having a gear rack; a gear carried by said housing adapted to mesh with said gear rack; a plurality of axially extending projections formed by said gear, said projections having a leading edge parallel to the gear axis and a trailing edge inclined thereto; a pawl slidably carried by said housing and having a flexible arm adapted to engage the leading edge of one of said projections to index said gear one tooth upon movement of said pawl; a detent cooperating with said gear to releasably hold said gear in its indexed position; a shutter mechanism cooperating with said aperture formed by said housing and movable between a closed position for covering said aperture and an open position for uncovering said aperture; and a slide transfer means slidably carried by said housing and having a first shoulder adapted to actuate said pawl to index said gear and advance said magazine one slide when said slide transfer means is moved into a fully withdrawn position, said slide transfer means further having a second shoulder and a cam adapted when said slide transfer means is moved inwardly to position a slide in register with said aperture for projection to respectively urge said pawl into its original position with said flexible arm riding over said trailing edge of said projection without moving said gear, and to move said shutter mechanism into said open position uncovering said aperture.

2. The invention as defined in claim 1 wherein said shutter mechanism comprises a pair of shutter blades slidably carried by said housing and cooperating with said aperture; and shutter blade actuating means for urging said shutter blades into said closed and open positions for covering and uncovering said aperture respectively, said shutter blade actuating means being biased by a spring to place said shutter blades in said closed position.

3. The invention as defined in claim 2 wherein said shutter blades have flanges provided with elongated slots, and said shutter blade actuating means comprises a lever pivotally mounted to said housing intermediate its ends each of said ends further forming an upturned lug disposed within one of said slots, said lever further having an upturned ear actuable by said cam, and a spring interposed between said housing and said ear to pivotally urge said lever in a direction causing said shutter blades to be moved into said closed position.

4. The invention as defined in claim 3 wherein said cam is provided with a flat portion adapted to cooperate with said ear to releasably hold said shutter mechanism in said open position against the bias of the spring when the slide transfer means is moved all the way in placing a slide in register with said aperture for projection.

5. In a slide changer for a slide projector, the combination of: a housing having an aperture through which a slide is projected; a support member disposed transversely of said housing for slidably supporting a magazine having a gear rack; a gear carried by said housing having gear teeth adopted to mesh with said gear rack; a plurality of axially extending projections formed by said gear, said projections having a leading edge parallel to the gear axis and a trailing edge inclined thereto; a pawl slidably carried by said housing and having a flexible arm adapted to engage the leading edge of one of said projections to index said gear one tooth upon movement of said pawl; a detent cooperating with said gear teeth to releasably hold said gear after it has been rotated a single tooth; and a slide transfer means slidably carried by said housing and having a first shoulder adapted to slidably move said pawl from one position to index said gear one tooth and advance said magazine one slide when said slide transfer means is moved into a fully withdrawn position, said slide transfer means further having a second shoulder adapted to urge said pawl into said one position with said flexible arm riding over said trailing edge of said projection without moving said gear when said slide transfer means is moved inwardly to position a slide in register with said aperture.

6. The invention as defined in claim 5 wherein said pawl comprises a channel member having a U-shaped slot therein to form a resilient finger adapted to engage said housing to frictionally hold said pawl in whatever position it is placed with respect to said housing.

7. In a slide changer for a slide projector, the combination comprising: a housing having an aperture through which a slide is projected; a support member disposed transversely of said housing; a magazine slidably mounted on said support member; a pair of shutter blades slidably carried by said housing and movable between a closed position for covering said aperture and an open position for uncovering said aperture, said shutter blades having flanges provided with elongated slots; a spring-biased lever pivotally mounted on said housing intermediate its ends, each of said ends having an upturned lug receivable by one of said slots, said lever further having an upturned ear; and a slide transfer means slidably carried by said housing and having a cam adapted to urge said ear and lever against the bias of said spring placing said shutter blades into an open position when said slide-transfer means is moved inwardly moving a slide out of said magazine into register with said aperture for projection, said spring adapted when said slide-transfer means is moved into a fully withdrawn position returning said slide to said magazine to bias said lever and shutter blades into said closed position.

8. The invention as defined in claim 7 wherein said cam is provided with a flat portion adapted to cooperate with said ear to releasably hold said lever and shutter blades in an open position against the bias of the spring when the slide-transfer means is moved all the way in placing a slide in register with said aperture for projection.

References Cited in the file of this patent

UNITED STATES PATENTS

| | | |
|---|---|---|
| 482,238 | Force | Sept. 6, 1892 |
| 786,883 | Edmonds | Apr. 11, 1905 |
| 946,501 | Force | Jan. 11, 1910 |
| 2,590,492 | Bennett et al. | Mar. 25, 1952 |
| 2,711,602 | Wiklund | June 28, 1955 |
| 2,724,989 | Badalich | Nov. 29, 1955 |
| 2,756,630 | Goldberg | July 31, 1956 |

FOREIGN PATENTS

| | | |
|---|---|---|
| 385,419 | Germany | Nov. 23, 1923 |